July 11, 1967 M. S. DIETZ ETAL 3,330,194
RANGEFINDER DEVICE FOR PHOTOGRAPHIC CAMERA
Filed March 15, 1965 2 Sheets-Sheet 1
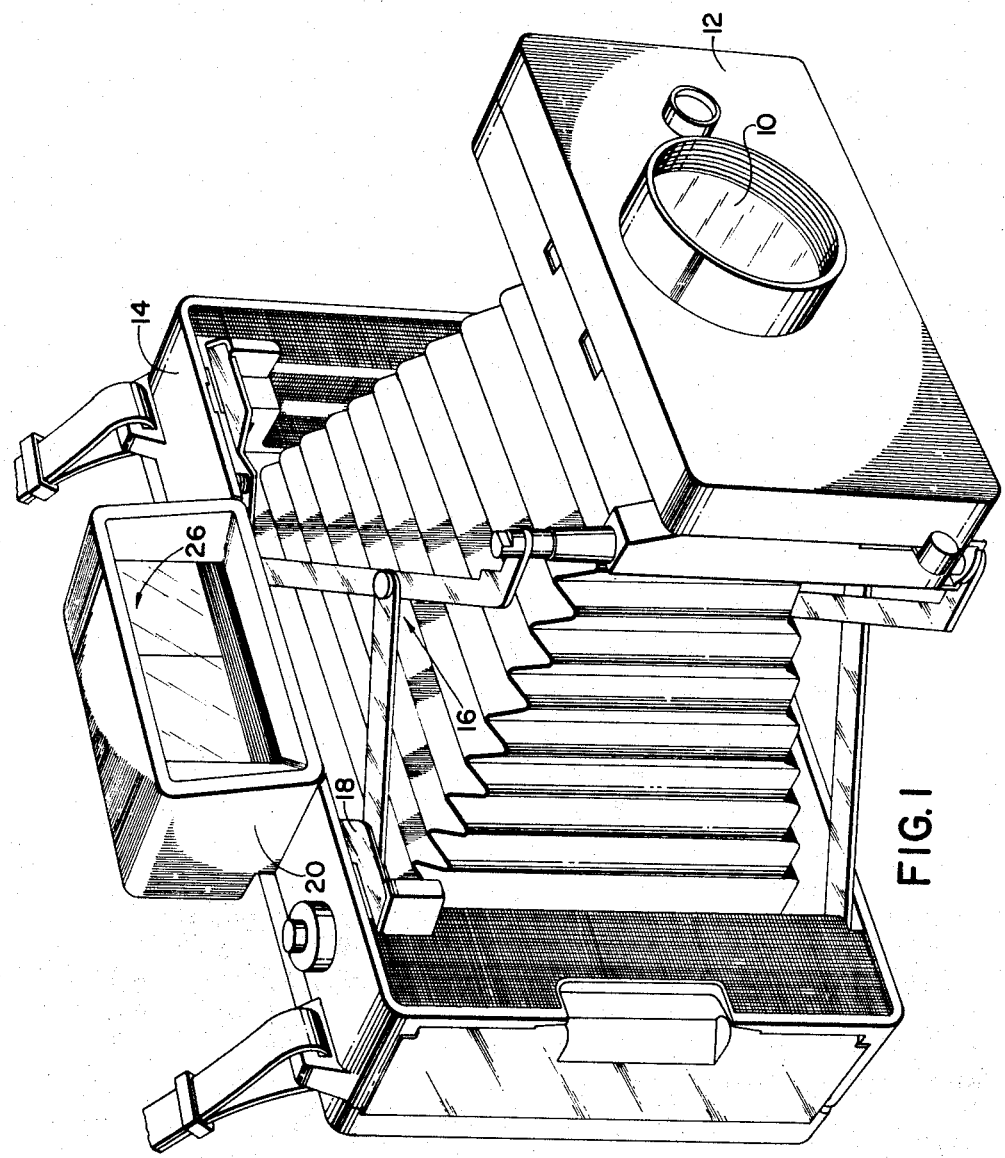
INVENTORS
Milton S. Dietz
and
BY Bruce H. Johnson
Brown and Mikulka
and
Charles S. McGuire
ATTORNEYS

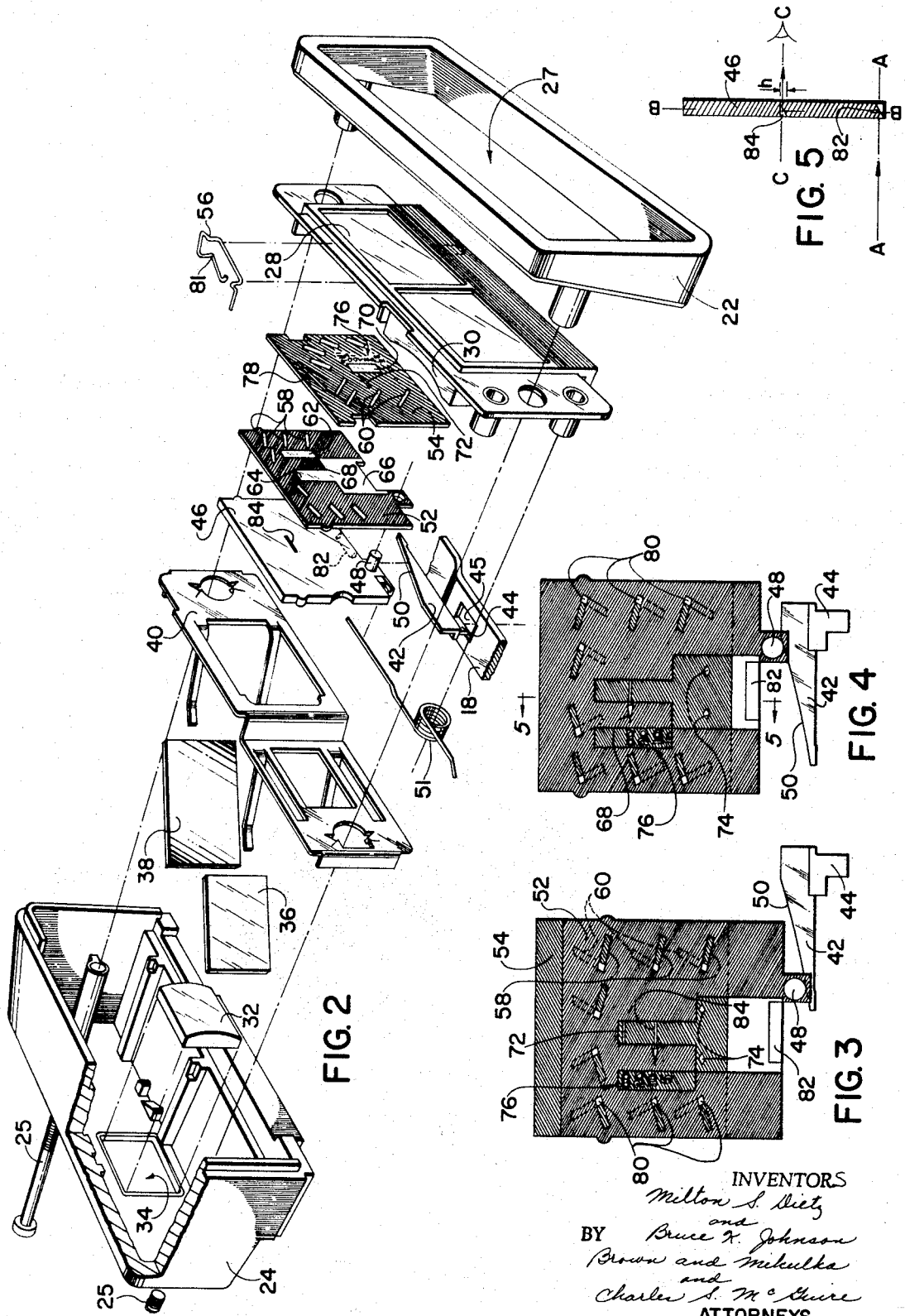

United States Patent Office 3,330,194
Patented July 11, 1967

3,330,194
RANGEFINDER DEVICE FOR PHOTOGRAPHIC CAMERA
Milton S. Dietz, Lexington, and Bruce K. Johnson, Woburn, Mass., assignors to Polaroid Corporation, Cambridge, Mass., a corporation of Delaware
Filed Mar. 15, 1965, Ser. No. 439,806
11 Claims. (Cl. 95—44)

ABSTRACT OF THE DISCLOSURE

This disclosure relates to stadiametric ranging apparatus for aiding in focusing the objective lens of a photographic camera, or the like, and to combination with said ranging apparatus of means for viewing the scene to be photographed.

---

Basically, the ranging device of the present invention is of the type wherein a pair of marks or lines are moved relative to one another in response to focusing movement of the objective lens. The desired focus position is achieved by visually matching the marks or lines with reference means of known dimensions at the plane which is in focus. Devices of this type have been well known for many years and combine basic geometric principles with a suitable mechanical linkage between cooperable elements of the objective lens and ranging device. In addition to the focusing guide provided by matching the marks with a reference object of substantially known dimensions, the present invention includes a focusing footage scale having a pointer movable with the said marks and visible as the marks are viewed during focusing. Further, the invention provides movable framing means to indicate the boundaries, at the plane which is focused at the camera film plane, of the scene to be photographed with compensation for parallax and field size changes throughout the focusing range of the objective lens.

It is a principal object of the invention to provide novel rangefinder means having the general features referred to above in a unique and improved combination.

A further object is to provide combined ranging and viewing means for a camera or the like which are simple and reliable in operation and economical in manufacture.

Another object is to provide viewfinder means having movable portions to indicate changes in field size and parallax in combination with rangefinder means of the type wherein reference marks are aligned with an object of known dimensions at the plane in focus.

Still another object is to provide rangefinder means of the general type described above wherein an image of the movable reference mark is presented to the eye of the operator in a novel manner permitting opaque means to be arranged in the operator's line of view of said mark.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a perspective view of a photographic camera incorporating the elements of the present invention for operation in conjunction therewith;

FIG. 2 is an exploded, perspective view of the elements of the invention with portions of the camera of FIGURE 1;

FIGS. 3 and 4 are front views of certain elements of FIG. 2 shown in two positions of their relative movement; and FIG. 5 is a side view, in vertical section on the line 5—5 of FIG. 4, of one of the elements of the device.

Referring now to the drawings, in FIGURE 1 is shown a photographic camera having the usual objective lens 10, mounted on lens board 12 for axial movement with respect to the film plane of the camera, contained within camera body 14. Lazy tong erecting system 16 and focusing bar 18 are provided for effecting focusing movement of lens 10 by manual movement of bar 18 in a direction transverse to the direction of focusing movement. This type of erecting and focusing system is described in much greater detail in U.S. application Ser. No. 214,560 of Robert S. Borghesani, filed Aug. 3, 1962. Although the rangefinder and viewfinder means of the present invention are shown in the drawings as operating in conjunction with this particular type of erecting and focusing system, it will be readily appreciated by those skilled in the art that the invention may be practised to equal advantage with many other well-known systems. Housing 20 for the principal elements of the rangefinder and viewfinder system of the present invention may be seen in FIGURE 1 mounted upon camera body 14.

Turning now to FIG. 2, the individual elements of the rangefinder and viewfinder system are shown in exploded, perspective view with a cooperable portion of focusing bar 18. Housing 20 may conveniently comprise separate front and rear sections, numbered 22 and 24 respectively, which may be individually moulded of a suitable plastic, for example. Screws 25 are provided for securing the front and rear sections together after assembly of the elements contained thereby. Transparent plate 26 is positioned in frontal opening 27 provided in front section 22 and includes planar portion 28 and negative lens 30. Plate 26 may conveniently be formed from glass, plastic or any other such transparent material having suitable optical properties. Eyepiece 32 is arranged in rearwardly disposed opening 34 of rear section 24 in optical alignment with negative lens 30. Dichroic mirror or beam splitter 36 is arranged along the optical axis of negative lens 30 and eyepiece 32 at an angle of substantially 45° thereto, and fully-reflecting mirror 38 is similarly arranged behind planar portion 28 of transparent plate 26, whereby mirrors 36 and 38 are substantially parallel to one another. Mirror retaining spring 40 is provided for engagement between mirrors 36 and 38 and interior portions of housing 20 to resiliently retain the mirrors in the desired position against appropriate stop means. Eyepiece 32 is preferably a positive lens, thereby forming the rear element of the usual reversed Galilean viewfinder system, of which negative lens 30 forms the front element.

Cam element 42 includes engagement portion 44 which extends through an appropriate opening in housing 20 for engagement in opening 45 of focus bar 18. Movable, transparent plate 46 is arranged in juxtaposed relation with planar portion 28 of transparent plate 26 for sliding movement with respect thereto. Pin 48 extends from plate 46 and is urged into engagement with cam surface 50 of element 42 by appropriate biasing means such as torsion spring 51. Thus, as focus bar 18 is moved manually to effect focusing movement of the camera objective, cam element 42 is moved through its engagement with the focus bar and the motion is transmitted to plate 46 through cam surface 50 and pin 48.

The elements providing a visual indication to the operator of the focus position of the camera lens and the boundaries of the scene to be photographed comprise cooperable transparent and opaque areas associated with fixed, planar portion 28 and movable plate 46. Since both portion 28 and plate 46 are transparent, coatings of suitable opaque materials may be applied directly thereto in the proper location, or additional masking means may be provided, as shown in the accompanying drawings. It is also possible to construct portion 28 and plate 26 of opaque materials with cut-out portions in the areas indicated as transparent. The masking means of the illustrated embodiment comprise movable mask 52, which is secured to movable plate 46, and fixed mask 54, which is retained in engagement with fixed, planar portion 28 of plate 26 by means of adjustment spring 56 for a purpose which is explained later in more detail. A most convenient and economical way in which masks 52 and 54 may be mass produced with great precision is by photographic methods. That is, the desired pattern is formed as a photographic negative having a transparent base material such as a conventional polyester, thus providing the transparent and opaque areas in proper relationship.

The opaque portions of masks 52 and 54 are indicated by diagonal shading, that on one mask being arranged at an angle of 90° to that of the other mask. The transparent areas of movable mask 52 include a plurality of elongated, rectangular areas, indicated by the reference numeral 58, arranged at a slight angle to the horizontal. Fixed mask 54 includes transparent areas 60, similar in size and shape to areas 58 of movable mask 52 but sloped in the opposite direction and at a somewhat steeper angle. The transparent areas of movable mask 52 further include rectangles 62 and 64, the latter having one edge contiguous with larger rectangle 66, and fiducial mark 68. The transparent areas of fixed mask 54 further include rectangle 70, narrow line 72, small, diamond-shaped areas 74 and indicia 76. The sloping, elongated, rectangular area designated by the reference numeral 78 is an opening cut out of mask 54, as opposed to the other areas which are actually transparent portions of the base material, for a purpose which will be explained hereinafter. It is to be understood that the specifically illustrated patterns, which function in a cooperative manner when the masks are juxtaposed during use, are only one of a number of equally suitable embodiments of such patterns suited to carry out the purpose of the invention within the scope of the appended claims.

In FIGS. 3 and 4 the masks are shown in operative, juxtaposed relation as seen from the rear, i.e. the side from which they would be viewed by an operator when in use. It may be seen that mirrors 36 and 38 are arranged to reflect light passing through masks 52 and 54 to eyepiece 32. Light may pass through the masks to be reflected to the eye of the operator only in those areas where no diagonal shading is shown on the drawings. Thus, when areas 58 of mask 52 overlap areas 60 of mask 54, the two areas cooperate to form diamond-shaped areas 80 which in turn cooperate with diamond-shaped areas 74 to form a rectangular array of such areas. This array will be superimposed on the image of the field being viewed by the operator through eyepiece 32 and viewfinder lens 30. By proper relative positioning of masks 52 and 54 at a given focus setting of camera objective lens 10 the visual image of the rectangular array of diamond-shaped areas may be superimposed on the operator's field of view of the scene to be photographed in conformity with the boundaries thereof which will be recorded on the film; for example, the picture area may be defined by the inner corners or points of the diamonds visible in the viewfinder.

Spring 56 and cut-out area 78 of mask 54 offer a convenient means for adjusting the relative positions of the masks to provide the desired relationship between the cooperative areas thereof and the focus position of the objective. Spring 56 is clipped over a top edge portion of plate 26 and retains mask 54 in engagement with the rearwardly disposed surface of planar portion 28. Portion 81 of spring 56 extends through opening 78 in mask 54, whereby lateral, sliding movement of spring 56 along the top portion of plate 26 will result in vertical movement of mask 54 due to the slope of opening 78. During assembly of the device, screws 25 may be loosely threaded into their respective openings so that a small object such as a pick may be inserted between front and rear housing portions 22 and 24 to move spring 56 until mask 54 is brought to the proper position. It will be understood, of course, that this movement of mask 54 is for adjustment purposes only during assembly of the device and that thereafter mask 54 remains fixed.

The movement of plate 46, and thus mask 52, in response to focusing movement of the camera objective has been previously explained. In FIGS. 3 and 4, mask 52 is shown in two different positions relative to mask 54. It may readily be seen that such movement will result in different portions of areas 58 and 60 overlapping one another with consequent change in the apparent position of diamond-shaped areas 80. Three sides of the rectangle defined by the array of diamond-shaped areas will thus be moved as the camera is focused. Proper design of cam surface 50 in relation to the optical properties of objective lens 10, in accordance with techniques well known in the art, will result in apparent movement of the diamonds to define a rectangle which is superimposed on the image of the scene to be photographed in substantial conformity with the picture area throughout the focusing range of the objective lens. Thus, the device provides means for visually framing the subject with automatic compensation for parallax errors and changes in field size.

Transparent rectangle 62 is provided in movable mask 52 so that indicia 76, formed as transparent areas of fixed mask 54, may be seen by the operator. Transparent rectangle 70 is provided in fixed mask 54 so that fiducial mark 68 in movable mask 52 may be seen throughout the limits of movement of mask 52. Mark 68 is so arranged with respect to indicia 76 that a focus distance or footage scale is provided thereby. This gives the operator a visual indication within the viewfinder of the distance from objective lens 10 to the scene which is focused thereby at the film plane of the camera throughout the focusing range of the objective.

Narrow, transparent line 72 is visible to the operator through transparent rectangle 64 of movable mask 52. Line 72, of course, remains fixed during focusing movement of the camera objective and provides a visual indication of one of the marks which are aligned with a reference object of known dimensions to effect proper focusing, as previously mentioned. It is necessary that at least one of the two marks which are used for rangefinding be movable in cooperation with focusing movement of the objective. The second mark or line, therefore, is associated with movable plate 46. It is further desirable that such a mark or line be parallel with line 72 and be moved in parallel relation thereto. From the arrangement of transparent and opaque areas of masks 52 and 54 previously described, however, it is apparent that the provision of such a line on mask 52, visible through mask 54, would present problems. For example, an opaque line in transparent rectangle 64 would not be visible to the operator since it would be aligned with an opaque portion of mask 54. Other arrangements would either necessitate staggering the positions of the lines or would make viewing thereof difficult at focus positions where the lines were close together.

The present invention provides prismatic means, formed integrally with movable plate 46, for making a second reference line visible to the operator. As seen most clearly in FIG. 5, surface 82 is formed in a lower portion of plate 46 to reflect light upwardly within the plate. That is, the portion of the plate which includes surface 82 acts as a "right angle," or "totally reflecting" prism to direct light entering along axis A—A to the path indicated by axis B—B. At the position on axis B—B where the image of the second reference line is to be visible, second prism means are formed by removing an appropriate portion of the forwardly disposed surface of plate 46. This provides surface 84 which directs a portion of the light from axis B—B to axis C—C, which represents the axis along which the light is reflected by mirrors 36 and 38 to the eye of the operator. Thus, plate 46 and the prismatic means formed therein act as a "light pipe" to provide an illuminated image of the movable reference mark, having an apparent height indicated in FIG. 5 by the letter $h$, visible to the operator during the viewing and ranging operation. The dimension $h$ is preferably equal to the height of line 72 in fixed mask 54, and the apparent widths of the reference lines are also preferably the same.

Surface 84 is so positioned on plate 46, with respect to the position of line 72, that the relationship between focusing movement of objective lens 10 and vertical movement of plate 46 enables the operator to focus the camera lens upon an object of known dimensions when the object is aligned between the apparent positions of line 72 and surface 84. Since the illustrated embodiment of the device is intended for use in a hand-held camera of the "snapshot" type, the scene being photographed will often include a person or persons. The distance from hairline to chin is substantially equal for most persons over the age of about 3 years, being about six to eight inches. Therefore, this distance provides a convenient reference dimension with which the positions of line 72 and surface 84 may be aligned. In the preferred embodiment, the aforementioned relationship between focusing movement of the objective lens and the resulting apparent positions of the visible reference lines is chosen so that a dimension of about six to eight inches which is aligned between the reference lines lies at the plane which is focused by the objective lens at the film plane of the camera. The forwardly disposed surface of plate 46, at least in that portion directly forward of surface 82, is preferably of such consistency that light entering the plate is diffused somewhat. In this way, an apparent "flickering" of surface 84, due to light being reflected from surface 82 from different angles during movement of plate 46, may be avoided.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A rangefinder device for a photographic camera having an objective lens and means for effecting focusing movement thereof, said device comprising, in combination:
    (a) means defining a field of view for an operator looking through said device, said field of view including the scene to be photographed;
    (b) fixed means carrying one of a cooperable pair of reference marks and one of a cooperable fiducial mark and set of indicia;
    (c) movable means carrying the other of said pair of reference marks and the other of said fiducial mark and set of indicia;
    (d) all of said pair of reference marks, fiducial mark and set of indicia being visible in said field of view; and
    (e) means for so moving said movable means in response to said focusing movement that a reference means of known dimensions aligned with said reference marks lies at the plane focused by said objective lens at the camera film plane, and said fiducial mark is aligned with a portion of said set of indicia indicating the distance from said objective lens to said plane.

2. The invention according to claim 1 wherein one of said pair of reference marks is visible in said field of view against an opaque background by means of light reflected from a point outside of said field of view.

3. The invention according to claim 2 wherein said one reference mark is carried by said movable means and said light is reflected by prismatic means formed integrally with said movable means.

4. Apparatus for use in conjunction with a photographic camera having an objective lens and means for effecting focusing movement thereof, said apparatus comprising, in combination:
    (a) an eye window through which an operator may view a scene to be photographed;
    (b) first masking means having a first predetermined pattern of opaque and transparent areas;
    (c) second masking means having a second predetermined pattern of opaque and transparent areas and arranged in juxtaposed relation with said first masking means;
    (d) means for transmitting light which passes through juxtaposed transparent areas of said first and second masking means to said eye window, whereby an image of the pattern formed by said juxtaposed transparent areas is visible to said operator;
    (e) means defining images of first and second reference marks visible through said eye window;
    (f) means for so moving at least one of said masking means and at least one of said reference marks in response to said focusing movement that said image of the pattern formed by juxtaposed transparent areas is superimposed on the operator's view of said scene to define the boundaries thereof which will be recorded on the film, and a reference means of known dimensions aligned with said reference marks lies at the plane focused by said objective lens at the camera film plane.

5. The invention according to claim 4 wherein said first reference mark is visible in the operator's field of view through said eye window against an opaque background by means of light reflected from a point outside of said field of view.

6. The invention according to claim 5 and further including a cooperable fiducial mark and set of indicia visible through said eye window and relatively movable in response to said focusing movement to indicate the distance from said objective lens and said plane focused thereby at the camera film plane.

7. The invention according to claim 6 wherein said images of said fiducial mark, said indicia and said second reference mark comprise portions of said transparent areas of at least one of said masking means.

8. A rangefinder device for a photographic camera having an objective lens movable to change the distance from said lens to the scene focused thereby at the camera film plane, said device comprising, in combination:
    (a) means defining a field of view for an operator looking through said device, said field of view including the scene to be photographed;
    (b) means defining images of first and second reference marks visible in said field of view;
    (c) means for illuminating the image of at least one of said reference marks by projecting the light providing such illumination into said field of view from a position remote therefrom;
    (d) means for effecting relative movement of said reference marks in response to focusing movement of said objective lens, said marks being so arranged that a reference means of substantially known dimensions which is visually aligned with respect to said marks lies in the plane of the scene which is focused at the camera film plane; and
    (e) means visible in said field of view and movable in response to focusing movement to define the boundary of said scene which is focused at the film plane throughout the range of said focusing movement.

9. A rangefinder device for a photographic camera having an objective lens and means for effecting focusing movement thereof, said device comprising, in combination:
(a) means defining a field of view for an operator looking through said device, said field of view including the scene to be photographed;
(b) means defining images of first and second reference marks visible in said field of view;
(c) means for illuminating the image of at least one of said reference marks by projecting the light providing such illumination into said field of view from a position remote therefrom; and
(d) means for effecting relative movement of said reference marks in response to focusing movement of said objective lens, said marks being so arranged that a reference means of substantially known dimensions which is visually aligned with respect to said marks lies in the plane of the scene which is focused at the camera film plane, an opaque background being arranged in said field of view at said apparent position, said one mark being visible by reflection of an illuminated image thereof to said apparent position against said opaque background.

10. A rangefinder device for a photographic camera having an objective lens and means for effecting focusing movement thereof, said device comprising, in combination:
(a) means defining a field of view along a view axis;
(b) means including mask means offset from said view axis and exposed to scene light for defining first and second reference marks comprising scene light transmitted substantially unattenuated from the scene;
(c) optical means for superimposing an image of said mask means upon said view axis such that said field of view includes a relatively bright image of said reference marks; and
(d) means for effecting relative movement of said reference marks in response to focusing movement of said objective lens, said marks being so arranged that a reference means of substantially known dimensions which is visually aligned with respect to said marks lies in the plane of the scene which is focused at the camera film plane.

11. The apparatus defined by claim 10 wherein said lens means includes an opening therein for transmitting scene light directly therethrough to define said first of said marks, and wherein said means including said mask means includes a pair of light reflective interfaces for effecting a transverse displacement in the axis of scene light defining said second reference mark from without to within the limits of said mask means such that said second mark appears in cooperative relationship with said first mark.

References Cited
UNITED STATES PATENTS

| | | | |
|---|---|---|---|
| 926,912 | 7/1909 | Vogt | 95—44 |
| 2,153,132 | 4/1939 | Crowther | 95—44 |

JOHN M. HORAN, *Primary Examiner.*